United States Patent
Daly et al.

(10) Patent No.: US 9,762,876 B2
(45) Date of Patent: Sep. 12, 2017

(54) DITHERING FOR CHROMATICALLY SUBSAMPLED IMAGE FORMATS

(71) Applicant: Dolby Laboratories Licensing Corporation, San Francisco, CA (US)

(72) Inventors: Scott Daly, Kalama, WA (US); Bongsun Lee, Cupertino, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/888,058

(22) PCT Filed: Apr. 2, 2014

(86) PCT No.: PCT/US2014/032731
§ 371 (c)(1),
(2) Date: Oct. 29, 2015

(87) PCT Pub. No.: WO2014/178989
PCT Pub. Date: Nov. 6, 2014

(65) Prior Publication Data
US 2016/0080712 A1 Mar. 17, 2016

Related U.S. Application Data

(60) Provisional application No. 61/817,222, filed on Apr. 29, 2013, provisional application No. 61/830,806, filed on Jun. 4, 2013.

(51) Int. Cl.
H04N 9/64 (2006.01)
H04N 19/00 (2014.01)
(Continued)

(52) U.S. Cl.
CPC ........... *H04N 9/646* (2013.01); *G09G 3/2003* (2013.01); *G09G 3/2048* (2013.01); *G09G 5/026* (2013.01);
(Continued)

(58) Field of Classification Search
CPC combination set(s) only.
See application file for complete search history.

(56) References Cited

U.S. PATENT DOCUMENTS 3,562,420 A 2/1971 Thompson
3,961,134 A 6/1976 Jarvis
(Continued)

FOREIGN PATENT DOCUMENTS

EP 1628470 2/2006
JP 5-91331 4/1993
(Continued)

OTHER PUBLICATIONS

Daly, S. et al "Decontouring: Prevention and Removal of False Contour Artifacts" Jan. 2004, Proc. of SPIE—The International Society for Optical Engineering, vol. 5292, pp. 130-149, Human Vision and Electronic Imaging.
(Continued)

*Primary Examiner* — Wesner Sajous

(57) ABSTRACT

Dithering techniques for images are described herein. An input image of a first bit depth is separated into a luma and one or more chroma components. A model of the optical transfer function (OTF) of the human visual system (HVS) is used to generate dither noise which is added to the chroma components of the input image. The model of the OTF is adapted in response to viewing distances determined based on the spatial resolution of the chroma components. An image based on the original input luma component and the noise-modified chroma components is quantized to a second bit depth, which is lower than the first bit depth, to generate an output dithered image.

23 Claims, 3 Drawing Sheets

(51) Int. Cl.
  *H04N 1/64* (2006.01)
  *H04N 9/68* (2006.01)
  *G09G 3/20* (2006.01)
  *G09G 5/02* (2006.01)
  *G09G 5/10* (2006.01)
  *H04N 19/90* (2014.01)

(52) U.S. Cl.
  CPC .............. *G09G 5/10* (2013.01); *H04N 1/646* (2013.01); *H04N 9/68* (2013.01); *H04N 19/90* (2014.11); *G09G 2340/02* (2013.01); *G09G 2340/06* (2013.01)

(56) References Cited

U.S. PATENT DOCUMENTS

| | | |
|---|---|---|
| 4,758,893 A | 7/1988 | Lippel |
| 5,138,303 A | 8/1992 | Rupel |
| 5,497,154 A * | 3/1996 | Komamura ......... H03M 1/0641 341/131 |
| 5,557,429 A | 9/1996 | Hirose |
| 5,696,602 A | 12/1997 | Cooper |
| 6,441,867 B1 | 8/2002 | Daly |
| 6,671,068 B1 | 12/2003 | Chang |
| 6,697,169 B1 | 2/2004 | Feng |
| 6,853,468 B2 | 2/2005 | Miller |
| 7,098,927 B2 | 8/2006 | Daly |
| 7,136,193 B2 | 11/2006 | Takata |
| 7,253,819 B1 | 8/2007 | Ganea |
| 7,352,373 B2 | 4/2008 | Feng |
| 7,474,316 B2 | 1/2009 | Daly |
| 7,548,177 B2 | 6/2009 | Moore |
| 7,554,555 B2 | 6/2009 | Daly |
| 7,692,665 B2 | 4/2010 | Daly |
| 7,876,247 B1 | 1/2011 | Hunt |
| 8,295,636 B2 | 10/2012 | Tsukamoto |
| 8,416,256 B2 | 4/2013 | Neal |
| 2005/0276502 A1* | 12/2005 | Brown Elliott ......... G06T 5/004 382/254 |
| 2006/0028484 A1 | 2/2006 | Yoshida |
| 2006/0262147 A1* | 11/2006 | Kimpe ..................... G09G 3/20 345/690 |
| 2007/0047658 A1 | 3/2007 | Tourapis |
| 2009/0225097 A1 | 9/2009 | Van Belle |
| 2011/0091130 A1 | 4/2011 | Faubert |
| 2011/0135218 A1 | 6/2011 | Moore |
| 2011/0267056 A1 | 11/2011 | Frick |
| 2012/0087411 A1 | 4/2012 | Haskell |
| 2012/0293540 A1 | 11/2012 | Feng |
| 2013/0046803 A1* | 2/2013 | Parmar ................ G09G 3/2048 708/203 |

FOREIGN PATENT DOCUMENTS

| | | |
|---|---|---|
| JP | 2003-316337 | 11/2003 |
| JP | 2007-208786 | 8/2007 |
| JP | 2010-044446 | 2/2010 |
| KR | 2004-0019353 | 3/2004 |
| TW | I235000 | 6/2005 |
| TW | 200951935 | 12/2009 |
| WO | 2010/064309 | 6/2010 |
| WO | 2011/014170 | 2/2011 |
| WO | 2012/125407 | 9/2012 |
| WO | 2013/158592 | 10/2013 |

OTHER PUBLICATIONS

Daly S. et al "Bit-Depth Extension Using Spatiotemporal Microdither Based on Models of the Equivalent Input Noise of the Visual System" Proc. of SPIE, International Society for Optical Engineering, vol. 5008, Jan. 1, 2003, pp. 455-466.

Deeley, R.J. et al "A Simple Parametric Model of the Human Ocular Modulation Transfer Function" Ophthalmic & Physiological Optics: the Journal of the British College of Ophthalmic Opticians, Jan. 1, 1991, pp. 91-93.

Williams, et al "Double-Pass and Interferometric Measures of the Optical Quality of the Eye" JOSA, 1994, pp. 3123-3135.

* cited by examiner

DITHERING FOR CHROMATICALLY SUBSAMPLED IMAGE FORMATS

CROSS REFERENCE TO RELATED APPLICATIONS

This application claims priority to U.S. Provisional Application No. 61/817,222, filed on 29 Apr. 2013, and U.S. Provisional Application No. 61/830,806, filed on 4 Jun. 2013, both incorporated herein by reference in their entireties.

TECHNOLOGY OF THE INVENTION

The present invention relates generally to images. More particularly, an embodiment of the present invention relates to the dithering of images represented by chromatically subsampled formats.

BACKGROUND OF THE INVENTION

As used herein, the term 'dithering' denotes a process of intentionally adding noise to randomize the quantization error due to bit-depth transformations applied to static or moving images or pictures. Dithering is applied so that when reducing the bid-depth of a signal, the average local values of the quantized output signal have the same bit-depth as the input.

For imaging applications, when N-bit images are converted to P-bit images (where P is lower than N), the visual system acts as the averaging process. For example, dithering may be used when going from a multi-bit-depth signal (e.g., N=8) to a binary signal (e.g., P=2). This case is also referred to as halftoning. In display technology, dithering may be applied to lower the bit-depth of the input (e.g. 10 bits) to match the lesser bit-depth of a target display (e.g., 8 bits).

As used herein, the term 'dynamic range' (DR) may relate to a capability of the human visual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or ophthalmological sense) have an intensity range that spans about 15 orders of magnitude. Adapted humans may perceive dim light sources of a few photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the term 'visual dynamic range' (VDR) or 'enhanced dynamic range' (EDR) may relate to the DR that is simultaneously perceivable by a HVS. As used herein, VDR may relate to a DR that spans 5-6 orders of magnitude, however it is not intended to be limited to any span of dynamic range, and VDR (or EDR) may be narrower or equal to HDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR) or standard dynamic range (SDR), in relation to VDR and HDR. Digital cinema systems exhibit some of the same limitations as other display devices. In the present application, "visual dynamic range (VDR)" is intended to indicate any extended dynamic range, which is wider than LDR or SDR, and may be narrower or equal to HDR.

In practice, images comprise one or more color components (e.g., luma Y and chroma Cb and Cr or R, G, and B) wherein each color component is represented by a precision of N-bits per pixel (e.g., N=8). Although luminance dynamic range and bit depth are not equivalent entities, they are often related. Images where N≤8 (e.g., color 24-bit JPEG images) are considered images of standard dynamic range, while images where N>8 may be considered images having high dynamic range capability. VDR and HDR images may also be stored and distributed using high-precision (e.g., 16-bit) floating-point formats, such as the OpenEXR file format developed by Industrial Light and Magic.

Despite recent advances in display processing, hardware limitations may still restrict the bit depth precision of the processing pipeline of VDR images and video. As appreciated by the inventors here, it is desirable to develop improved techniques for dithering images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
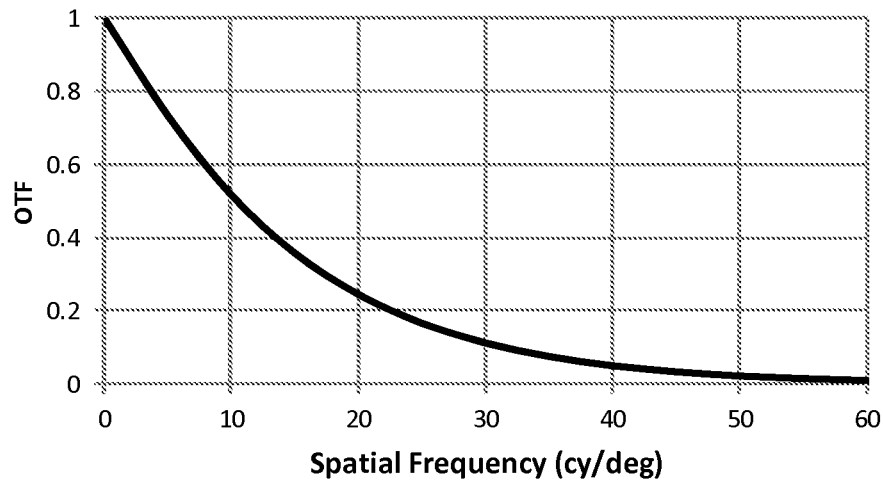
FIG. 1A depicts an example of an optical transfer function (OTF) of the human visual system.

Dithering techniques for images are described herein. A model of the optical transfer function (OTF) of the human visual system (HVS) is used to shape noise which is added to the color components of a chromatically subsampled video signal. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail in order to avoid unnecessarily obscuring the present invention.

Overview

Example embodiments described herein relate to the dithering of images. An input image of a first bit depth is separated into a luma and one or more chroma components. A model of the optical transfer function (OTF) of the human visual system (HVS) is used to generate dither noise which is added to the chroma components of the input image to generate noise-modified chroma components. The dither noise is generated by filtering pseudo-random white noise using a filter that is based on the inverse of the OTF, where the model of the OTF is adapted in response to viewing distances determined based on the spatial resolution of the subsampled chroma components.

In one embodiment, the dithered output image is generated by quantizing the input luma component and the noise-modified chroma components to a second bit depth which is lower than the first bit depth.

In another embodiment, the input luma signal component and the noise-modified chroma components are converted to a second image in a second color format before being quantized to the second bit depth to generate the dithered output image.

In some embodiments the input image signal is converted to a linearized color space before being dithered.

In some embodiments the OTF model is based on the Deeley OTF model for a fixed pupil size.

In some embodiments the filtered white noise is further adjusted according to local region analysis of the input image before being added to the chroma components.

Example of OTF-Based Dithering Noise Generation

Given, a sequence of N-bit input images (e.g., N=8 bits) to be quantized down to a P-bit images, where P<N bits, during digital dithering, noise is added to these images before the lower bits are dropped or quantized. The basic engineering trade-off is to add as much noise as possible to enable the preservation of as much effective perceptual bits through the bit depth reduction process, yet have the noise itself be invisible. The invisibility depends primarily on display and viewing distance parameters. In an embodiment, the noise characteristics of the noise source used in image dithering are determined based on a model of the optical transfer function (OTF) of the human visual system (HVS).

The OTF of the HVS, from now on to be denoted simply as OTF, is a strictly low-pass function, and is thus a better representative to an averaging process than the contrast sensitivity function (CSF) of the HVS. Further, the OTF is a linear shift-invariant filter in the linear luminance domain, whereas the CSF is a complex nonlinear process, sometimes modeled as a combination process of filters and amplitude nonlinearities. Lastly, the majority of the high-frequency attenuation of the CSF is caused by the OTF.

In an example embodiment, the dither noise may be spectrally shaped so that it is the inverse of the OTF, so that the behavior of the visual system's OTF will result in a perceptually uniform noise, equally visible at all frequencies. This will give the maximum noise variance for any level of visibility. In general, the design approach is to keep the dither noise equally invisible for all frequencies. That is, the OTF's effect on the noise is precompensated, so the noise reaching the retina is a white noise.

The OTF can be modeled with several functions, arising from different data sets, and the particular version used is not important. For example, Williams et al, in "Double-pass and interferometric measures of the optical quality of the eye," JOSA A 11.12 (1994): 3123-3135, incorporated herein by reference, describe the OTF using the following equations:

$$M(s, s_0) = D(s, s_0)(w_1 + w_2 e^{-as}) \quad (1)$$

$$D(s, s_0) = \frac{2}{\pi}\left[\cos^{-1}\left(\frac{s}{s_0}\right) - \left(\frac{s}{s_0}\right)\sqrt{1 - \left(\frac{s}{s_0}\right)^2}\right] \quad s < s_0$$

where s is visual frequnecy in cy/deg, and the equation parameters are a=0.1212, $w_1$=0.3481, and $w_2$=0.6519.

Another common OTF representation is described in Deeley, Robin J., Neville Drasdo, and W. Neil Charman. "A simple parametric model of the human ocular modulation transfer function." Ophthalmic and Physiological Optics 11.1 (1991): 91-93, which is incorporated herein by reference in its entirety.

Figure 1B:
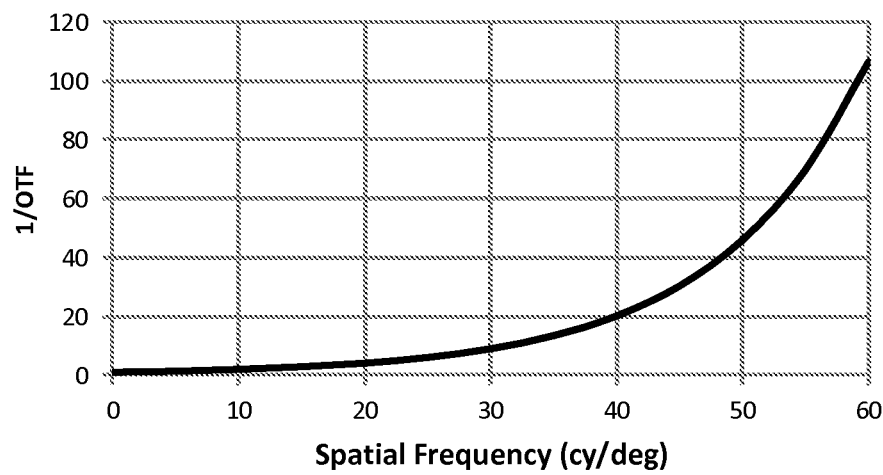
FIG. 1B depicts an example of an inverse of the optical transfer function of the human visual system.

The advantage of the Deeley model is that it is parameterized for pupil size, d. The equation for this OTF is given by:

$$OTF(f, d) = e^{-\left(\frac{f}{20.9 - 2.1d}\right)^{(1.3 - 0.07d)}} \quad (2)$$

Where f is the spatial frequency in cycles per degrees (cy/deg) and d is the pupil size in millimeters (mm). FIG. 1A depicts an example of the OTF function according to equation (2) for a 3 mm pupil (d=3). FIG. 1B depicts the inverse (1/OTF) of FIG. 1A.

In some embodiments, instead of using the OTF function, one may apply any low-pass filter defined withing the frequency spectrum of the HVS (e.g., 0 to 60 cy/dec). Then the 1/OTF noise filter (220) may be represented by any high-pass filter defined withing the frequency spectrum of the HVS.

In order to apply the OTF to the digital image domain, the frequencies need to be converted from cy/deg to cy/pixel. (Note that 0.5 cy/pixel is the Nyquist folding frequency, that is, the maximum possible frequency that can be carried in a digital image). The following equations are used to convert between the visual spatial frequencies, given in cy/deg, to physical frequencies, such as cy/mm, or the digital frequencies, in cy/pixel:

$$\frac{cy}{mm} = \frac{180}{\pi D(\text{in mm})}\left(\frac{cy}{deg}\right), \quad (3)$$

$$\frac{cy}{pixel} = \frac{180}{\pi D(\text{in pixels})}\left(\frac{cy}{deg}\right), \quad (4)$$

where D is the viewing distance, measured either in the same units as the physical frequencies in equation (3), (e.g., in mm) or in pixels (see equation (4)). For example, when viewing full high-definition (HD) television (e.g., using a 1920×1080 pixel resolution), at the common three picture heights viewing distance (3H), D=3×1080=3240 pixels.

Spectral Shaping for Chromatic Subsampling

In an example embodiment, dithering is applied to signals with a luminance/chrominance (also to be referred as luma/chroma) representations of a video signal, such as YCbCr, YUV, Lab, and the like. In such representations, the majority of the luminance information is carried in the Y or L signals. The chrominance components signals (e.g., CbCr) carry very little luminance information, and are referred to as being approximately isoluminant, or pseudo-isoluminant.

In an embodiment, dither noise is added solely to the pseudo-isoluminant signals, such as Cr and Cb, and not to the luminance component. This is because the visibility of noise and other spatial patterns is much higher in the luminance channel than the chromatic channels.

In an embodiment, the spectrum of the noise is shaped based on the spatial resolution of the chroma components, which may be different than the spatial resolution of the luma component. For example, using a 4:2:2 chromatic sampling, chroma components are sub-sampled by a factor of two in the horizontal direction. For example, a 1920×1080 video signal may comprise a luma signal component (e.g., Y) at a 1920×1080 spatial resolution and chroma signal components (e.g., Cb and Cr) at a 960×1080 spatial resolution. In another example, using 4:2:0 chromatic sampling, chroma components are sub-sampled by a factor of two in both the horizontal and vertical directions. Then a 1920×1080 video signal may comprise chroma components at a 960×540 spatial resolution.

In an embodiment, the noise is added in the subsampled domain. Before finally being displayed, the chromatically subsampled image is upsampled as needed for display (e.g., to a 4:4:4 representation) and generally is converted from a luma/chroma representation to an RGB representation to drive the display primaries. The dither noise, which is added to the signal, also undergoes the same process and its spectrum is altered by the geometry of chromatic upscaling process. Therfore, it is designed to be compensated by the upscaling process such that it has the desired spectal shape after the upsampling process. The desired spectral shape is the inverse of the OTF, as described previously.

Figure 2A:
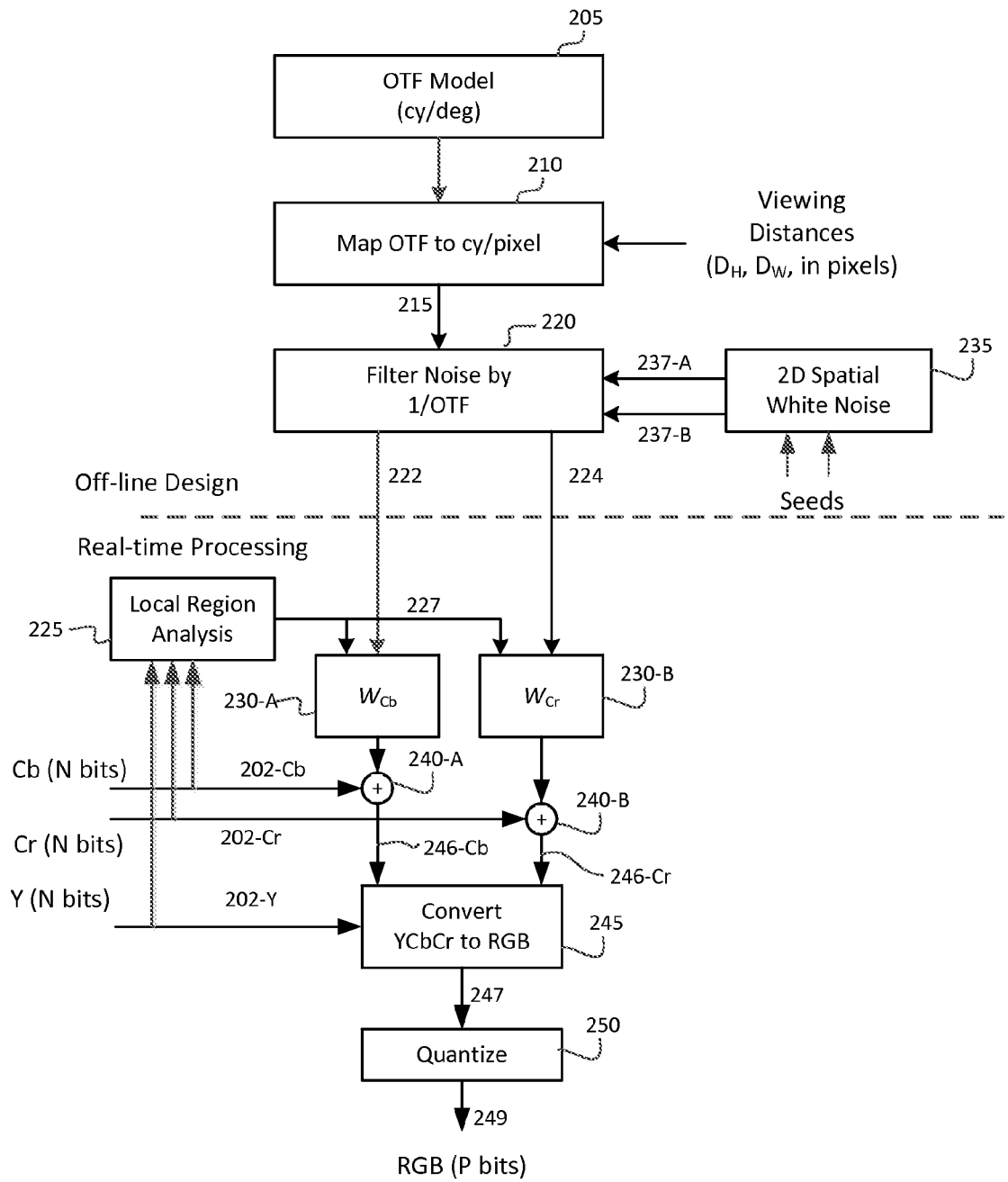
FIG. 2A and FIG. 2B depict example processes for dithering chromatically subsampled images according to embodiments of this invention.

FIG. 2A depicts an example process for dithering chromatically subsampled YCbCr images according to an embodiment of this invention. As depicted in FIG. 2A, the dithering process may be divided into two parts: a) an off-line design of the dither noise generator and b) a real-time dithering processing, where noise is added to the signals to be quantized.

As depicted in FIG. 2A, without limitation, the dither noise generation process is typically performed off-line. In an embodiment, the resulting dither noise patterns for the chroma components may be stored in memory; however, provided there are enough computation resources, this part of the process may also be performed in real-time.

As depicted in FIG. 2A, the dither noise generation process begins in step (205) by establishing an OTF model. In an example embodiment, without limitation, the OTF model may be the Deeley model of equation (2) for a fixed value of d. In an embodiment, d=3 mm, representing a bright light; however, the OTF function may be easily adjusted for other light conditions. In step (210), the output of the original OTF model may be adjusted so that its output is represented in cy/pixels, where the viewing distance (e.g., D) in equation (4) represents the viewing distance for the sub-sampled chroma component at the spatial direction of interest. For example, for HD 1920×1080 signals, processed in a 4:2:2 format, for the OTF model for vertical frequencies, $D_H$=3H=3×1080=3,240 pixels. Similarly, for the OTF model for horizontal frequencies, $D_w$=3$H_s$=3×(1080/2)=3×540=1620 pixels.

Using separate OTF models for the vertical and horizontal frequencies (e.g., OTF($f_h$, d) and OTF($f_w$, d)) based on equation (2)), one may generate a 2-D OTF model (e.g., OTF($f_h$, $f_w$)). In some embodiment, the 2-D model may be Cartesian separable (e.g., OTF($f_h$, $f_w$)=OTF($f_h$, d)*OTF($f_w$, d)). In some other embodiments, the joint model may be Polar-separable.

In general, the OTF function is rotationally symmetric, hence it is Polar separable; however, a Cartesian model may work as well due to variations across humans. In an example embodiment, let $$r=\sqrt{f_w^2+f_h^2},\qquad(5)$$

then OTF($f_h$, $f_w$)=OTF(r, d) of equation (2).

Step (235) represents a two-dimensional white (e.g. Gaussian) noise generator. In a preferred embodiment the noise generator generates distinct noise outputs (237-A and 237-B) for each of the chroma channels using two separate pseudo-random generator seeds. In an example embodiment, for noise output within the (0,255) range, the noise generator may generate white noise with σ=30.

Each of the outputs (237-A, 237-B) of the noise generator (235) is filtered using a filter based on the inverse of the OTF (that is, 1/OTF). Filtering may be performed either in the spatial domain or in the frequency domain. Since the OTF (215) is typically in the frequency domain, filtering in the frequency domain comprises a) transforming the output (237) of the noise generator in the frequency domain, say by using a Fast Fourier Transform (FFT) b) multiplying the output of the transform step by the inverse OTF, and c) transforming the product back to the spatial domain by using an inverse transform, such as an inverse FFT. Hence, the outputs (222 and 224) of the noise filter (220) represent two sets of 2D dither noise patterns to be added to the chroma components (e.g., 202-Cr and 202-Cb) of the input signal to be dithered (e.g., signal 202).

As depicted in FIG. 2A, the outputs of noise filter (220) may be optionally scaled by weights $W_{Cb}$ and $W_{Cr}$. In one embodiment, these weights may be image independent, adjusted according to the characteristics of a target display (such as its dynamic range and primaries). In another embodiment, the weights may also be further adjusted based on a local region analysis of the input image (202) to compensate in case of detecting highly saturated input colors. In cases of highly saturated color regions, the intended isoluminant noise modulations become luminance modulations. For example, an intended Cr modulation on a pure green color (RGB=(0, 1, 0)) tends to appear as a luminance modulation because the small introduced modulations of red are around 0, which is black. The intended negative R modulations are clipped and since these R subpixels are neighboring G subpixels, which are turned on completely the positive modulations in red will not be perceived. Also, since G is at maximum value, any positive G modulations will be clipped. Therefore in color regions such as this, it is better to shift the chromatic modulation entirely to the other channel, e.g., in this example, the Cb channel. Various combinations of reweighting the chromatic noise modulations can be applied. As an example, in an embodiment, assuming during normal processing $W_{Cb}$ and $W_{Cr}$ denote image-independent weights, then for pixels determined to be within a "full red" range (e.g., R>200, G<10, and B<10), the local region analysis step (225) may adjust the two weights as follows:

If input pixel is "full red"

then $W_{Cr} = c1 * W_{Cr}$ and $W_{Cb} = c2 * W_{Cb}$;

where c1 and c2 are predetermined scalers (e.g. c1=0 and c2=2.0).

In some embodiment, the local region analysis (225) may operate in a color domain (e.g., RGB) different than the input color domain (e.g., YCbCr). In some other embodiments, the local region analysis (225) may operate in the same color domain as the input color domain (e.g., YCbCr).

After optional weighting (230-A and 230-B), dithering noise is added to the chroma components (202-Cb and 202-Cr) of the input signal (202) to generate noise-modified color components (246-Cb, 246-Cr). Dithering noise (222 and 224) may be represented in a smaller bit-depth than the input signal bit-depth. In an embodiment, noise and signal are added by aligning the least-significant bits of the two signals.

Following the addition of the dither noise, the original luma signal (202-Y) and the noise-modified chroma signals (246-Cb and 246-Cr) may be quantized directly, or they may be converted first to a display-dependent color space (e.g., RGB) in step (245). This step may also comprise up-sampling of the chroma components to match the resolution of the luma component. Following (optional) color conversion (245), its output (247), may be quantized to the desired bit-depth (e.g., P<N) for each color component using any of known in the art quantization schemes to generate the output dithered image (249). The addition of the filtered noise to the sub-sampled chroma components signals, the subsequent conversion back to RGB, and the truncation of bit-depth in RGB are shown as the real-time process in the bottom half of FIG. 2.

In some embodiments, the input signal to be dithered (e.g., 202) may be in a gamma-corrected domain, which is approximately a power function of luminance (e.g., 1/2.2). In some embodiments, to take advantage from the fact that the OTF filtering process acts like a linear filter in the linear luminance domain, an additional signal-linearization step (not shown) may precede the noise-adding steps (240-A and 240-B). In such embodiments (not shown), signal (202) may be generated by a) converting an original input YCbCr signal to RGB, b) applying an inverse gamma function to the RGB signal, and c) converting back to linear YCbCr (e.g., Y'Cb'Cr'). In some other embodiments, the dither noise addition steps may be performed in an alternative linearized color space (e.g., LMS or CIE XYZ). In such embodiments, the color conversion step (245) may be adapted as needed (e.g., LMS to RGB or XYZ to RGB).

Figure 2B:
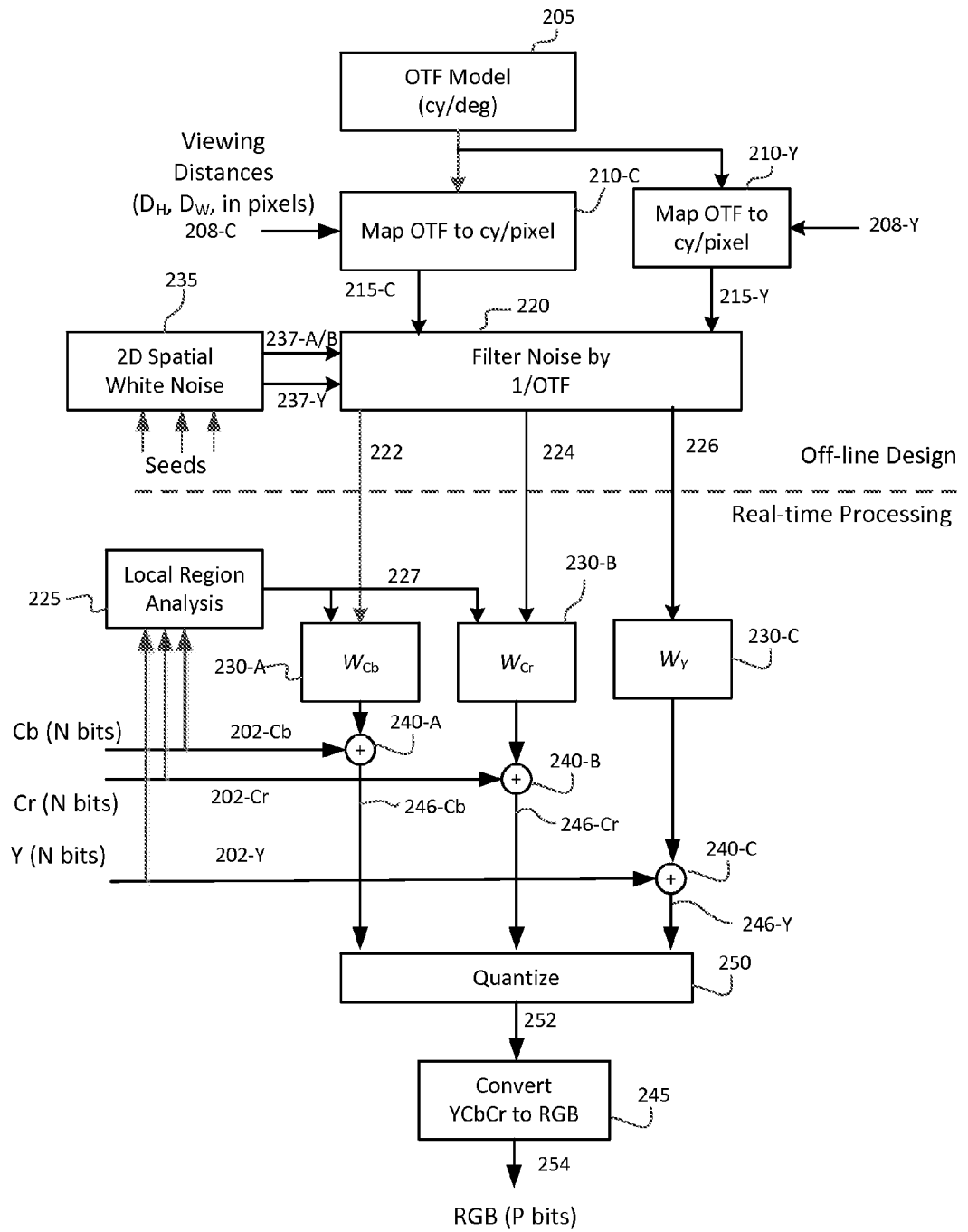

FIG. 2B depicts an example process for dithering chromatically subsampled YCbCr images according to another embodiment of this invention. The main difference between the embodiments depicted in FIGS. 2A and 2B is that in the system depicted in FIG. 2B dither noise is added to both the pseudo-isoluminant signals, such as Cr and Cb, and the luminance component Y (202).

As depicted in FIG. 2B, as part of the "off-line-design," luma-related dithering signal (226) may be generated using a similar approach as the one used to generate chroma-related dithering signals (222 and 224) as discussed earlier. Given an OTF model (205), and viewing distances (208-Y) calculated in the input sample domain, the input OTF model is mapped from cy/deg into a cy/pixel representation using equations (3) and (4). The key difference between mapping functions (210-C) and (210-Y) is that in (210-C) the viewing distances are calculated in the sub-sampled chroma domain, while in (210-Y) the viewing distances are computed in the input, full-resolution, domain.

Filter (220) comprises now three separate 1/OTF filters, one for each color component, each filter filtering white noise generated by 2D spatial white noise generator (235) discussed earlier. Noise generator (235) may use now three distinct seeds, one for each of the color components.

As depicted in FIG. 2B, during the real-time processing step, the luma-related output (226) of noise filter (220) may also be optionally scaled by scaler (230-C) using weight $W_Y$. After optional weighting (230-A, 230-B, 230-C), dithering noise is added to both the chroma components (202-Cb and 202-Cr) and the luma component (202-Y) of the input signal (202) to generate noise-modified color components (246-Cb, 246-Cr, and 246-Y).

Following the addition of the dither noise, the modified luma signal (246-Y) and the noise-modified chroma signals (246-Cb and 246-Cr) are quantized by quantizer (250) to the desired bit-depth (e.g., P<N) using any of known in the art quantization schemes to generate the output dithered image (252).

In some embodiments, quantization (250) may be followed by optional color conversion (245) (e.g., YCbCr to RGB) to a color domain suitable for display or other post-processing to generate dithered signal (254). This step may also comprise up-sampling of the chroma components to match the resolution of the luma component.

In some embodiments, as depicted in FIG. 2A, color conversion (245) may precede the quantization step (250).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to image dithering, such as those described herein. The computer and/or IC may compute any of a variety of parameters or values that relate to image dithering as described herein. The image dithering embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for image dithering as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to image dithering are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to dither images, the method comprising:
by apparatus comprising one or more data processors configured by software, one or more programmable logic devices, one or more logic circuits or a combination thereof:
receiving an input image in a first bit depth, the input image represented in a first color format comprising a luma component and one or more chroma components;
generating white noise;
filtering the white noise according to the inverse of an optical transfer function (OTF) of the human visual system (HVS) to generate dither noise, wherein the OTF is adapted in response to at least a horizontal viewing distance or a vertical viewing distance, the horizontal and vertical viewing distances being based on spatial resolution of the chroma components; and
adding the dither noise to the one or more chroma components to generate noise-modified chroma components.

2. The method of claim 1, further comprising adding the dither noise to the luma component to generate a noise-modified luma component.

3. The method of claim 1, further comprising:
converting the luma component and the noise-modified chroma components to a second image in a second color format; and
quantizing the second image to generate an output dithered image in a second bit depth, wherein the second bit depth is lower than the first bit depth.

4. The method of claim 2, further comprising:
quantizing the noise-modified luma component and the one or more noise modified chroma components to generate an output dithered image in a second bit depth, wherein the second bit depth is lower than the first bit depth.

5. The method of claim 1, further comprising:
quantizing the luma component and the noise-modified chroma components to generate an output dithered image in a second bit depth, wherein the second bit depth is lower than the first bit depth.

6. The method of claim 1 wherein the white noise comprises two or more separate white noise outputs, wherein each noise output is generated using a different seed number.

7. The method of claim 1, wherein a model of the OTF comprises the function $$OTF(f, d) = e^{-\left(\frac{f}{20.9-2.1d}\right)^{(1.3-0.07d)}},$$

where d denotes the size of a human pupil in mm and f comprises input spatial frequency in cycles/degrees.

8. The method of claim 7, wherein d=3 mm.

9. The method of claim 7, wherein the OTF model is adapted to the digital image domain by converting frequencies between cycles/degrees to cycles/pixel by using a conversion function $$\frac{cy}{\text{pixel}} = \frac{180}{\pi D(\text{in pixels})}\left(\frac{cy}{deg}\right),$$

wherein D denotes a viewing distance measured in pixels.

10. The method of claim 1, wherein at least one chroma component of the input image comprises a spatial resolution that is lower than the spatial resolution of the luminance component of the input image.

11. The method of claim 10, wherein the horizontal resolution of at least one color component of the input image is half of the horizontal resolution of the luminance component of the input image.

12. The method of claim 1, wherein the first color format comprises a 4:2:2 or 4:2:0 YCbCr color format.

13. The method of claim 6 wherein each of the components of the white noise output is filtered separately to generate one or more dither noise components.

14. The method of claim 13 further comprising:
scaling a first dither noise component by a first noise scale factor to generate a first scaled dither noise component; and
scaling a second dither noise component by a second noise scale factor to generate a second scaled dither noise component, wherein the first and second scale factors are determined in response to local region analysis of the input image.

15. The method of claim 14, wherein the local region analysis comprises detecting whether at least a pixel of the input image is within one or more predetermined bounds of pixel component values.

16. The method of claim 4 wherein before converting the luma component and the noise-modified chroma components to the output dither image in the second bit depth, the noise-modified chroma components are up-scaled to match the spatial resolution of the luma component.

17. The method of claim 1 wherein the first color format is a linearized color format.

18. The method of claim 17, wherein the linearized color format is linearized YCbCr, LMS, or CIE XYZ.

19. The method of claim 1, wherein the steps up to generating the dithering noise are computed off-line by the processor, while the remaining steps are computed in real-time by the processor or a second processor.

20. A method to dither images, the method comprising:
by apparatus comprising one or more data processors configured by software, one or more programmable logic devices, one or more logic circuits or a combination thereof:
receiving an input image in a first bit depth, the input image represented in a first color format comprising a luma component in a first spatial resolution and one or more chroma components in a second spatial resolution, the second spatial resolution being lower than the first spatial resolution in at least a vertical or a horizontal direction;
generating white noise;
filtering the white noise according to the inverse response of a first low-pass filter to generate chroma dither noise, wherein the response of the first low-pass filter is adapted in response to the second spatial resolution;
filtering the white noise according to the inverse response of a second low-pass filter to generate luma dither noise, wherein the response of the second low-pass filter is adapted in response to the first spatial resolution;
adding the luma dither noise to the luma component to generate a noise-modified luma component;
adding the chroma dither noise to the one or more chroma components to generate noise-modified chroma components; and
generating an output dithered image in a second bit depth in response to quantizing the noise-modified luma component and the noise-modified chroma components, wherein the second bit depth is lower than the first bit depth.

21. The method of claim 20, wherein the responses of the first low-pass filter and the second low-pass filter match the response of a model of an optical transfer function of the human visual system.

22. An apparatus comprising a processor and configured to perform the method of claim 1.

23. A non-transitory computer-readable storage medium having stored thereon computer-executable instructions for executing a method in accordance with claim 1.

* * * * *